(12) United States Patent
Römer et al.

(10) Patent No.: US 7,444,837 B2
(45) Date of Patent: Nov. 4, 2008

(54) METHOD AND DEVICE FOR MELTING GLASS USING AN INDUCTION-HEATED CRUCIBLE WITH COOLED CRUST

(75) Inventors: Hildegard Römer, Karben (DE); Michael Leister, Budenheim (DE); Uwe Kolberg, Mainz (DE); Karl Mennemann, Taunusstein (DE); Guido Räke, Pfuggen-Schwabenheim (DE); Ernest Walter Schäfer, Welgesheim (DE); Sybill Nüttgens, Frankfurt (DE); Volker Ohmstede, Mainz (DE)

(73) Assignee: Schott AG, Mainz (DE)

( * ) Notice: Subject to any disclaimer, the term of this patent is extended or adjusted under 35 U.S.C. 154(b) by 339 days.

(21) Appl. No.: 10/490,909

(22) PCT Filed: Oct. 1, 2002

(86) PCT No.: PCT/EP02/11006

§ 371 (c)(1),
(2), (4) Date: Oct. 20, 2004

(87) PCT Pub. No.: WO03/031355

PCT Pub. Date: Apr. 17, 2003

(65) Prior Publication Data

US 2005/0039492 A1   Feb. 24, 2005

(30) Foreign Application Priority Data

Oct. 2, 2001   (DE) ................ 101 48 754

(51) Int. Cl.
*C03B 5/02*   (2006.01)

(52) U.S. Cl. ............ 65/135.6; 65/135.1; 65/134.1; 65/347; 65/355

(58) Field of Classification Search ........... 65/135.6, 65/135.1, 134.1, 135.2, 347, 346, 355, 374.12
See application file for complete search history.

(56) References Cited

U.S. PATENT DOCUMENTS 5,613,994 A   3/1997   Muniz et al.

FOREIGN PATENT DOCUMENTS

| | | | |
|---|---|---|---|
| DE | 199 39 779.1 | * | 8/1999 |
| DE | 199 39 785 | | 2/2001 |
| DE | 19939771 | | 2/2001 |
| DE | 19939786 | | 2/2001 |
| DE | 19939772 | | 3/2001 |
| DE | 19939782 | | 5/2001 |
| DE | 19939784 | | 5/2001 |
| DE | 100 41 757 | | 2/2002 |
| DE | 101 38 109 | | 9/2002 |
| EP | 1 078 890 | | 2/2001 |
| FR | 2 561 761 | | 9/1985 |
| FR | 2 589 228 | | 4/1987 |
| GB | 627 863 | | 8/1949 |
| US | 10/049948 | * | 2/2002 |
| WO | WO 01/14263 | | 3/2001 |
| WO | WO 01/14265 | | 3/2001 |
| WO | WO 01/14267 | * | 3/2001 |

OTHER PUBLICATIONS

Petrov Yu.B. et al, "Continuous casting glass melting in a cold crucible induction furnace," XV Int Congress on Glass Proceedings, vol. 3A, 1989, pp. 72-77, XP000075308 Leningrad, SU (w/English abstract).

* cited by examiner

*Primary Examiner*—Mark Halpern
(74) *Attorney, Agent, or Firm*—Ohlandt, Greeley, Ruggiero & Perle, L.L.P.

(57) ABSTRACT

A method and an apparatus for the rapid melting of glasses in a skull crucible is provided. The method and apparatus introduce high-frequency energy into the contents of the crucible by means of a coil arrangement surrounding the skull crucible, in order to heat the melt, and the batch is laid and the molten glass discharged in the upper region of the crucible, and undissolved constituents of the batch are retained by means of a cooled bridge which is immersed in the melt. The glass is taken off above the coil arrangement and is fed for further processing without flowing through the coil region.

20 Claims, 5 Drawing Sheets

Figure 1 a) (Cake-slice base)    b) (Meandering arrangement)

METHOD AND DEVICE FOR MELTING GLASS USING AN INDUCTION-HEATED CRUCIBLE WITH COOLED CRUST

This application is a 371 of PCT/EP02/11006 filed on 1 Oct. 2002.

BACKGROUND OF THE INVENTION

1. Field of the Invention

The invention relates to a method and an apparatus for the rapid melting of in particular high-purity, aggressive and high-melting glasses in a skull crucible, in which high-frequency energy is introduced into the contents of the crucible by means of a coil arrangement surrounding the skull crucible, in order to heat the melt, and the batch is laid and the molten glass discharged in the upper region of the crucible, and undissolved constituents of the batch are retained by means of a cooled bridge which is at least partially immersed in the melt from above.

2. Description of Related Art

Nowadays, aggressive glasses which are required to have a high purity are melted discontinuously in platinum crucibles or continuously in platinum tank furnaces. Both the melting tank furnace and the refining tank furnace and the homogenization tank furnace consist of platinum. This melting technology is disadvantageous on account of the high costs of the precious metal and also the short service lives of platinum equipment of this type. In particular the melting region, where batch reactions take place, is exposed to considerable corrosion and is therefore often the limiting component of a platinum tank furnace in terms of the service lives. On account of the heating technology via the platinum wall and the stability of the platinum, the maximum throughputs which can be achieved with equipment of this type are less than 1 t per day for a melting tank furnace or crucible volume of 90 l.

In addition to platinum melting units, it is also known to use skull crucibles, which are formed from water-cooled, spaced-apart metal tubes and in which the melt is heated by means of induction coils which surround the crucible, by high-frequency energy being radiated in. Melting equipment of this type has the advantage that the water cooling means that a protective layer of material of the same composition of the glass is inevitably formed in the edge region of the crucible, so as to surround the melt in the form of a crucible of the same composition of the glass, so as to provide protection against impurities.

PETROV, YU. B. ET AL.: "Continuous casting glass melting in a cold crucible induction furnace", XV INTERNATIONAL CONGRESS ON GLASS 1989, PROCEEDINGS, Vol. 3a, 1989, pages 72-77 has disclosed a crucible of the abovementioned type for melting high-purity glasses. In this crucible, the batch is supplied in the upper crucible region and the glass is likewise taken off in the upper crucible region. The batch and outlet region are separated from one another by a cooled bridge, which is immersed deep in the melt, in order to retain undissolved constituents of the batch. The melted glass is taken off at the upper edge of the crucible via an overflow channel arranged inside the coil and drops downward in the form of a glass strand between the crucible wall and the internal radius of the coil.

The document does not give any information as to how the glass strand is collected and then fed for further processing. However, it is obvious that in the arrangement described the possibilities for connecting the melting unit to the further-processing units are very limited. Moreover, with the known procedure it is likely that the quantity of glass in the glass strand will be subject to fluctuations over the course of time, so that at best only a quasi-continuous procedure is possible. A further drawback is that the drop height of the glass strand has to be very great, since the glass has to drop through at least the entire height of the coil before it can be collected in a channel or tank furnace arranged outside the coil. Consequently, it is likely that bubbles will be introduced into the melt and that the quality with regard to cords will deteriorate. Furthermore, cooling of the glass in the glass strand may be problematic in the case of high-melting glasses. The problem may be that the glass is not guided and therefore starts to splash. Furthermore, sparkovers may occur between coil and glass strand or between glass strand and crucible, which can lead to destruction of the coil and/or of the crucible.

Furthermore, document FR-A 2 561 761 has disclosed an apparatus with an inductively heated, cold melting crucible for the ongoing removal of melted substances. The melt is removed via a discharge made from refractory material. Moreover, an inclined, pivotable retaining device is provided in the melting crucible, in front of the discharge.

Document FR-A 2 589 228 shows a similar apparatus for the continuous production of materials which are obtained from substances in the molten state. In this apparatus, the material overflows continuously from a cold melting crucible, via a pipeline or channel, into a vessel.

However, the abovementioned apparatuses are in need of further improvement, in particular with regard to the melting capacity and the glass quality which can be achieved.

SUMMARY OF THE INVENTION

It is an object of the invention to refine a melting method or apparatus of the known type in such a way that simple components which are as conventional as possible are used to link the melting unit to the further-processing stations and that the glass quality is not adversely affected by the forced use of a connecting technique in accordance with the prior art.

This object is achieved by a method in accordance with claim 1 and an apparatus in accordance with claim 8.

Surprisingly, it has emerged that for uniform melting of the contents of the crucible it is not absolutely imperative for the entire volume of the melt to be arranged inside the induction coil, as is known from the prior art, a measure which in the prior art is supposed to result in the high-frequency energy being introduced as uniformly as possible in the entire volume of the melt but on the other hand means that it is not possible for the melting crucible to be connected to the downstream further-processing units using conventional components, on account of the disruption caused by the coil arrangement.

According to the invention, the glass level in the crucible projects above the upper end of the coil arrangement at least sufficiently far for it to be possible for the glass outlet to be arranged completely above the coil arrangement. Furthermore, the outer end of the glass outlet projects beyond the outer radius of the induction coil. This means that the glass can be fed for further processing without flowing through the coil region. It is simple and inexpensive to connect the melting crucible to the next further-processing unit using conventional components, since there are no disruptive coils in the way. There are no restrictions whatsoever on the choice of subsequent components, and consequently any possible adverse effects on the quality of the glass resulting from the type of connection can be minimized when a suitable connection technique is selected.

It is surprising that the method and apparatus according to the invention do not lead to any significant cooling of the melt above the coil region. A major role in this context appears to be played by the type of heating and the convective flows which are induced as a result. The high-frequency heating means that the hottest zone in the glass is generated in the middle of the melt volume, in the center of the coil geometry. The crucible walls, by contrast, are cold, on account of the water cooling. It appears that as a result a strong convective circulation is formed, transferring large quantities of heat out of the hot core into the upper, colder regions of the melt volume (cf. in this respect FIG. 1). The formation of the convective circulation can be enhanced further by additional bubbling, as will be explained in more detail below.

It has been found that this effect can be boosted still further by the use of the cooled bridge. Melt which passes into the region of the cooled bridge is cooled by the latter and drops downward toward the base. A downward flow is formed, and this evidently generates a type of "cooling curtain" or "flow curtain" in the melt. This behavior likewise boosts the circulation of the entire melt located in the melting region of the crucible. The use of bridges in melting technology is inherently known, and these bridges are usually employed in order to prevent undissolved constituents of the batch from flowing through direct to the glass outlet. In addition to its purely mechanical separating action between melting region and outlet region, the water-cooled bridge according to the invention therefore also provides a thermal separation between the two regions by the formation of the above-described "cooling curtain" or "flow curtain". Consequently, the separating action of the bridge extends much further into the glass volume than its simple geometric dimensions.

It is essential to the invention that this effect occurs even with only slight bridge penetration depths. In the method and apparatus according to the invention, excessively great penetration depths of the cooled bridge could lead to the glass outlet freezing up, since the upper region of the melt volume and also the glass outlet are located above the region where the high-frequency energy is introduced.

BRIEF DESCRIPTION OF THE DRAWING

The invention is explained in more detail below with reference to the figures, in which:

FIGS. 2a and b show two different embodiments of the baseplate of a skull crucible;

FIGS. 3a, b, c diagrammatically depict plan views of three preferred embodiments of the design and arrangement of the cooled bridge according to the invention;

DETAILED DESCRIPTION OF THE INVENTION

Figure 1:
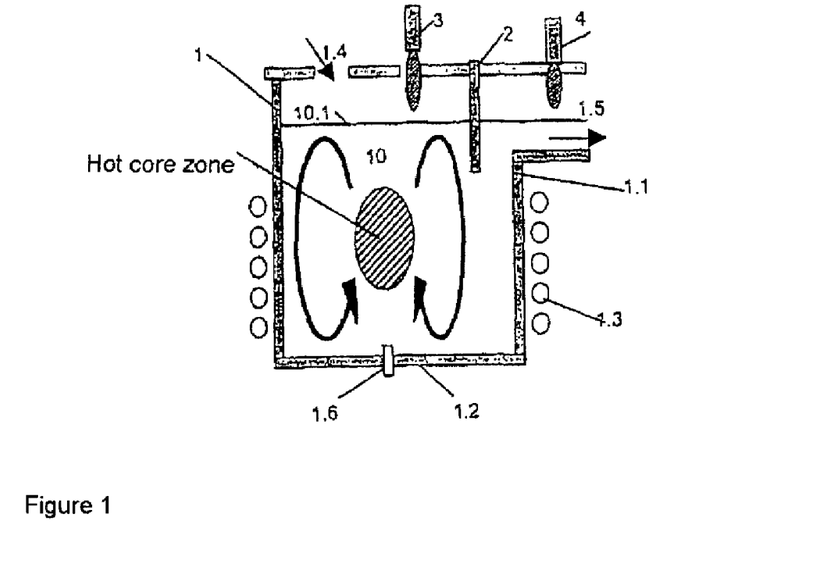
FIG. 1 diagrammatically depicts a vertical section through a melting crucible in accordance with the invention (illustrating the convection circulations and the hot core zone)

FIG. 1 shows a melting apparatus in accordance with the invention, having a skull crucible 1. In the embodiment illustrated, the skull crucible 1 comprises a cylindrical crucible wall 1.1.

Details of the crucible structure are described below but are not all illustrated in the figure, for the sake of clarity.

The crucible wall 1.1 is constructed from a ring of vertical metal tubes which are connected to one another at the top and bottom in meandering form. The crucible base 1.2 may likewise comprise metal tubes or segments, or may alternatively be made from refractory material.

The metal tubes are connected to at least one coolant feed and coolant discharge. The coolant used is generally water. The coolant is guided over a meandering path corresponding to the arrangement of the metal tubes. Depending on the size of the crucible, it is possible to provide a plurality of coolant circuits for cooling individual ring segments. In the base region of the crucible, in the case of relatively small special steel crucibles with a volume of up to 50 l, the metal tubes are held spaced apart from one another and are not connected to one another in an electrically conductive manner. In the case of copper crucibles, it is also possible to design larger crucibles of up to 100 l with spaced-apart tubes. In order in this case to prevent an electrical short circuit, by way of example mica platelets are positioned between adjacent tubes. In the case of crucibles with very large melting volumes, it may be expedient, as described in DE 199 39 780.5 A1, for an electrical short circuit between the tubes also to be positioned in the base region. At the upper end of the crucible, all the tubes are electrically short-circuited with one another.

Figure 2:
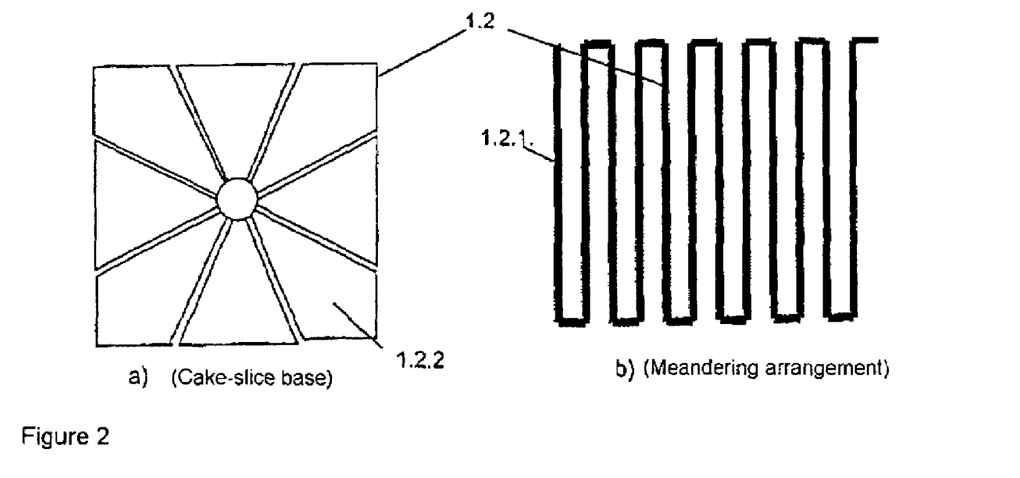

The base 1.2 of the skull crucible 1 is electrically insulated from the crucible wall 1.1. This is achieved, for example, by means of a Quarzal or mica plate. Of course, it is also possible for other electrically nonconductive materials to be used here. The base 1.2 is likewise cooled and, as illustrated in FIG. 2, may, for example, comprise meandering tubes 1.2.1 or metallic pieces 1.2.2 arranged in a similar manner to slices of cake. It is obvious that the invention is not restricted to these specific configurations of the crucible. The invention also encompasses other crucible shapes, geometric arrangements of the metal tubes and configurations of the crucible base.

The crucible 1 is heated in the customary way by an induction coil 1.3 which surrounds the crucible wall 1.1 and by means of which high-frequency energy can be introduced into the contents of the crucible. The glass melt 10 is located in the crucible 1. The surface of the glass melt 10 is denoted by 10.1 in FIG. 1.

The crucible has an inlet 1.4 for supplying batch and an outlet 1.5 for discharging the molten glass.

It is essential to the invention that, as illustrated in FIG. 1, only the lower part of the crucible be surrounded by the induction coil 1.3. The crucible 1 is arranged in such a way relative to the coil 1.3 that the melt inside the crucible projects significantly out of the coil region, i.e. the surface 10.1 of the melt 10 is located well above the upper end of the induction coil 1.3. The glass outlet 1.5 is likewise arranged above the upper end of the coil and extends beyond the outer radius of the induction coil. This ensures that the melt can be taken off outside the region enclosed by the induction coil 1.3, i.e. without flowing through the coil region, and fed to the further-processing units. Since the connecting location is outside the induction coil region, the glass outlet 1.5 can be connected in a simple way to any further-processing units by means of conventional components.

A further feature which is essential to the invention is the arrangement of a bridge 2 in the upper part of the crucible 1. The bridge 2 is at least partially immersed in the melt and thereby separates the batch region from the overflow and outlet region. Even slight immersion depths are sufficient to form the flow curtain mentioned in the introduction.

The correct dimensioning of crucible, outlet and bridge and their arrangement relative to one another depends on the individual case and can easily be determined by the person skilled in the art at any time by means of a few simple routine experiments. The following values for the positioning of the bridge, the coil and the glass outlet have proven expedient for a skull crucible with a volume of 30 l: it has proven advantageous for the bridge to be immersed in the glass melt to a depth which is such that its lower end is located approximately 1 to 2 cm below the bottom of the glass outlet 1.5. This in any event ensures that undissolved constituents of the batch cannot flow through under the bridge and to the outlet. However, the bridge should advantageously still be located above the induction coil, preferably approximately 1 cm above it. More preferably, the distance between the lower end of the bridge and the upper end of the coil should be 2 cm. In principle, it is also possible for the end of the bridge to project into the coil region. In this case, however, it should be noted that the deeper the bridge penetrates into the coil region, the more the high-frequency field is displaced, with the result that the extent to which it is introduced drops and the melt in the outlet region may freeze.

The glass level in the outlet should be at least 2 cm. Otherwise, there is again a risk of the melt freezing.

The outer end of the glass outlet should project at least 2 cm beyond the outer circumference of the coil. If it projects by less than this amount, it is necessary to provide electrical insulation for the systems which adjoin the glass outlet.

Figure 3:
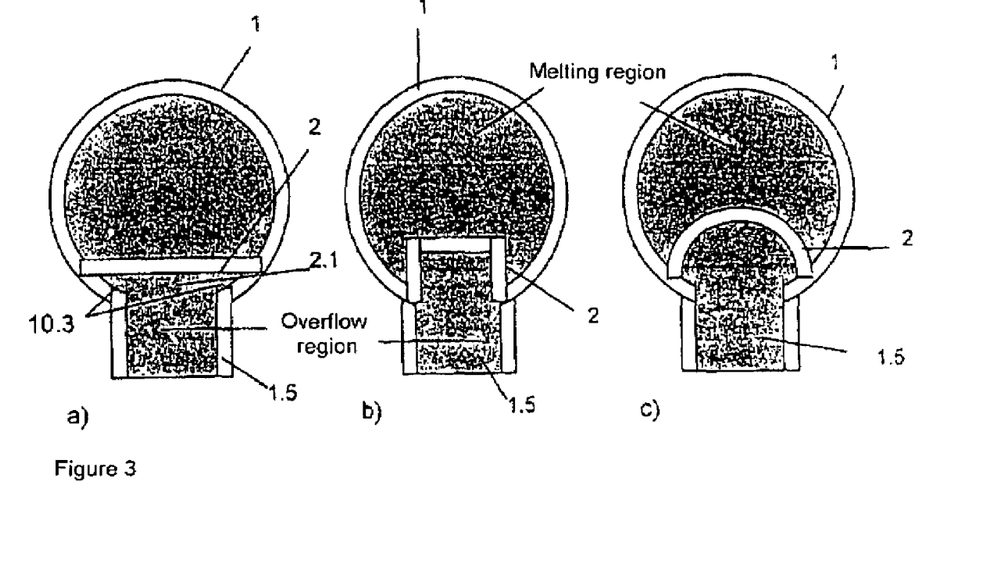

In general, the geometry of the bridge 2 can vary. FIG. 3 shows three different preferred embodiments of a bridge. The figures each illustrate a plan view of the cylindrical skull crucible 1 with glass outlet 1.5 and a preferred variant of the bridge 2. The bridge 2 may have a straight cross section (FIG. 3a), an angular cross section (FIG. 3b) or a curved cross section (FIG. 3c).

It can be seen from FIG. 3a that with the "straight" embodiment of the bridge 2, what are known as "dead" zones 10.3, which are separated from the melting region by the bridge, are formed in the melt 10. In these dead zones 10.3, the ratio of energy supplied by the high-frequency radiation to energy dissipated by the cooling is very unfavorable, and there is a risk of the melt freezing. Moreover, this area is not available to the melting region, which leads to losses of melting capacity. This effect is slight in the case of small crucibles, and therefore in these crucibles the use of a straight bridge is still recommended for the sake of simplicity. Once larger melting volumes start to be used (>70 l), it is expedient to take measures to return these zones to the melting region. Possible solutions are represented by the round and angular bridges illustrated in FIGS. 3b and c. In these embodiments, the "dead" zones 10.3 are significantly reduced in size, with the angular variant offering the advantage of being simpler to realize in structural terms.

Figure 4:
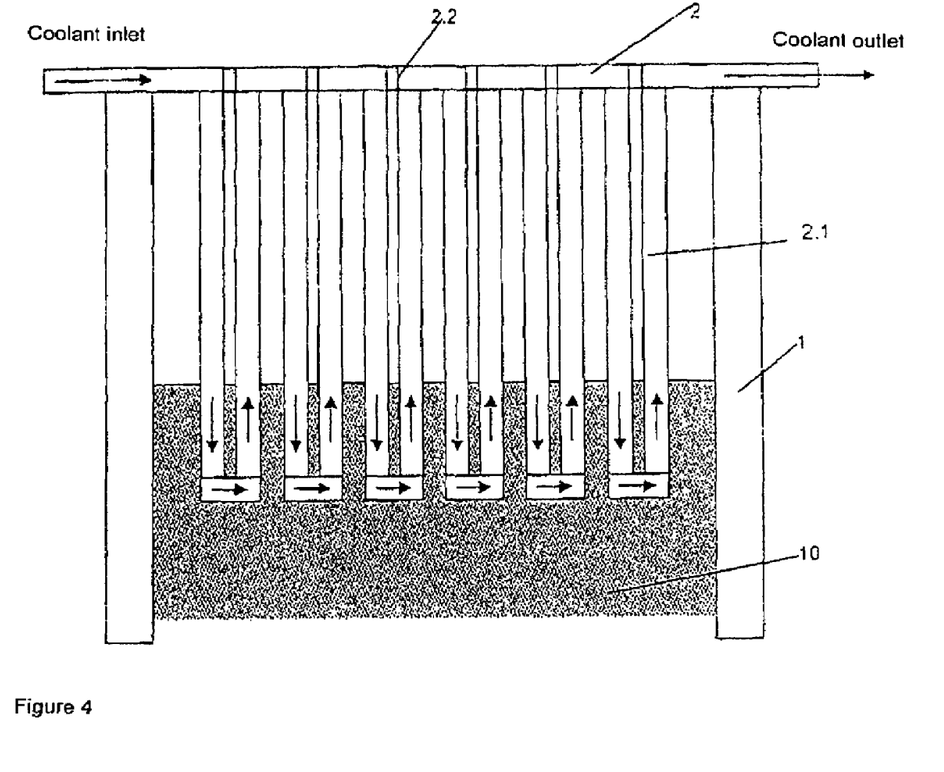
FIG. 4 diagrammatically depicts a vertical section through a cooled bridge in a preferred embodiment.

Irrespective of the specific embodiment, the bridge 2, like the entire crucible wall 1.1, has to be composed of cooled, preferably metallic components. In order to have the minimum possible effect on the high frequency, the bridge 2 is preferably, as illustrated in FIG. 4, composed of individual tubes 2.2 which are arranged in meandering form with respect to the coolant path and are connected to one another in an electrically conductive manner at their upper ends. In this case, an electrical short circuiting of both all the tubes 2.2 of the bridge 2 or bridge parts with respect to one another and with the skull crucible 1 itself is also effected with the aid of an electrical contact (metal connection).

In preferred embodiments of the invention, the melting crucible 1 and the bridge 2 may be made from special steel, platinum, copper or aluminum. Which metal is expediently used depends on the composition of the glass to be melted and the demands imposed on its purity. If special steel or copper skull crucibles are used, the corrosion resistance of the crucible material can also be improved by application of a coating of a highly thermally stable plastic, the decomposition temperature of which is below the temperature of coating in the coating/melt contact region. Examples of suitable plastics materials include plastics with a high fluorine content, in particular PTFE. A coating of this nature has the further advantage that exposed parts of the crucible are protected from attack by components which evaporate out of the glass melt. The thickness of the coating is to be such that the cooling by the metal tubes is still sufficient to keep the contact temperature between coating and melt below the decomposition temperature of the plastic. Coating with plastic has the further advantage that the glass does not stick to the coated parts and that the likelihood of sparkovers between the metallic skull tubes is reduced. It is also possible for a crucible made from a metal with a relatively low resistance to corrosion to be coated with a metal with a higher resistance to corrosion.

Figure 5A:
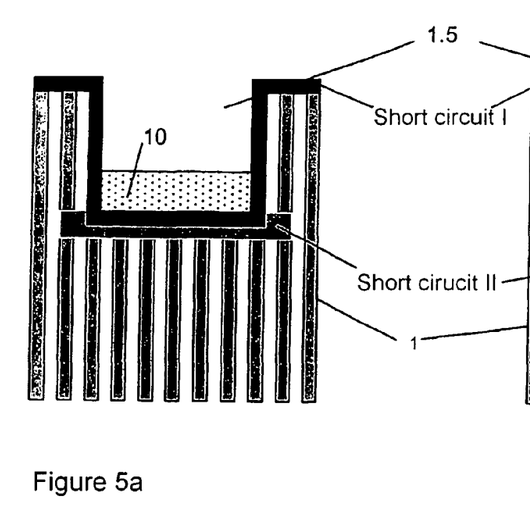
FIG. 5a, b diagrammatical depict a front and side view of the arrangement of the electrical short-circuiting connections in the outlet region.
Figure 5B:
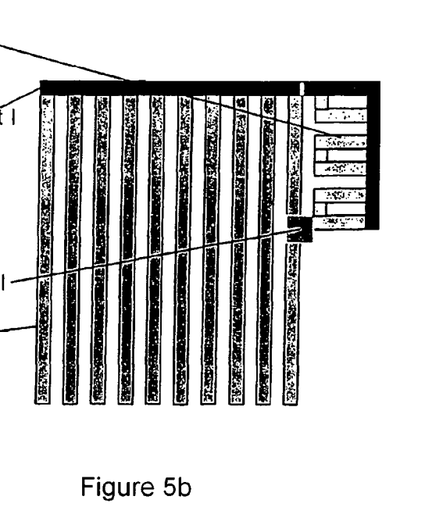

In a preferred embodiment, the outlet 1.5 is formed by the cooled tubes of the skull crucible, which are bent over through 90° in the upper region of the crucible. These tubes, as illustrated in FIG. 5, are connected to one another in an electrically conductive manner at their ends, so that the outlet region also has a short-circuiting ring I, which surrounds the outlet 1.5 itself and the bridge 2 with it. Moreover, it has proven expedient to additionally provide a further short-circuiting section II, which connects all the tubes which have been bent over through 90° to one another in an electrically conductive manner below the outlet 1.5 and in each case also surrounds the two tubes which delimit the outlet on both sides and lead upward again. In this way, the risk of HF sparkovers between the angled-off tubes of the overflow region and the adjacent tubes of the skull crucible wall which are not angled off is minimized.

Figure 6:
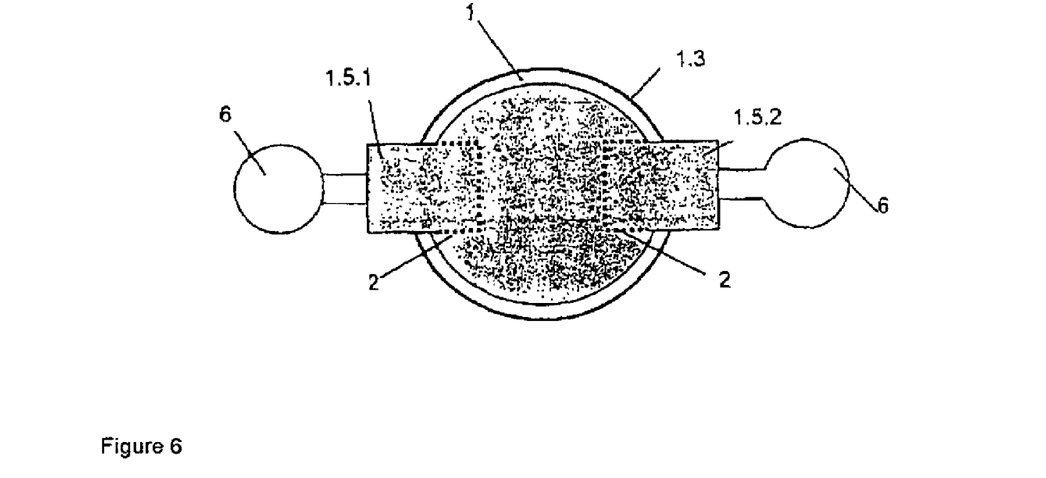
FIG. 6 diagrammatically depicts a plan view from above of a melting crucible according to the invention with two outlets.

In the case of crucibles in which a relatively great melting capacity for a glass (>200 ml/min) is achieved, it is also possible to provide a plurality of (two to four) outlets. FIG. 6 shows an embodiment with two outlets 1.5.1/1.5.2. In this exemplary embodiment, the outlets 1.5.1 and 1.5.2 are positioned diametrically opposite one another (180° interval). This has the advantage that the homogenization units 6 can be arranged as far away from one another as possible in spatial terms. By way of example, a plurality of outlets located closer together (e.g. at 90° intervals) are also possible. They could be arranged so close together that they can be shielded from the batch by a common bridge. A crucible with a plurality of outlets has the advantage that if there is a need for complicated hot-forming which can only process low throughputs of glass, it is if desired possible to supply two lines with one crucible. This option is of particular interest if the glass requires no further refining downstream of the melting section, since in this case all that is required is second shaping, and there is no need for any Pt refining chamber, which is expensive on account of the presence of Pt.

Good refining of the glass requires a relatively long residence time in the refining unit, and consequently only relatively low glass throughputs can be achieved. The maximum melting capacity of the HF unit cannot be utilized with one outlet and one refining chamber, since there is a lack of refining chamber capacity. If two outlets and, correspondingly, two refining chambers are used, this drawback can be canceled out, but this solution is associated with the high Pt costs of the refining chamber. It would also be possible to carry out refining using a further HF unit rather than with a Pt refining chamber.

To increase the throughput or melting capacity, it is possible for the melting temperature to be increased virtually to any desired extent, since in this case there are no wall contact materials acting as restricting parameters. Moreover, in particular in the case of glass melts with a high viscosity, an agitation movement produced by bubbling has a favorable effect on the melting capacity. Bubbling of this nature can be carried out in a skull crucible (1) either by means of at least one bubbling tube which is inserted from above, as illustrated in FIG. 1, or by bubbling nozzles 1.6 positioned at the crucible base 1.2.

Further acceleration of the melting capacity can be achieved by the use of additional top heat in the region where the batch is laid. For this purpose, it is possible to use either, as shown in FIG. 1, a burner 3 or direct or indirect electrical heating.

If a burner is used to generate the top heat, it may be useful for the skull crucible to be designed as a mushroom skull, as described in DE 199 39 772 C2, the content of disclosure of which is hereby incorporated in its entirety. In this embodiment, the cooled metal tubes of the skull crucible are bent off into the horizontal in the upper crucible region below the melt surface, so that they form a cooled collar just below the melt surface. The temperature of the melt decreases toward the outside in the region of the collar. The glass melt may in this case be cooled in the edge region of the collar to a sufficient extent for it to be possible for a ring of refractory material to be fitted onto this edge as a continuation of the crucible wall in the upper crucible region. With this arrangement, the cooled metal tubes are completely covered with glass melt on the side facing the melt and are therefore protected from the corrosive action of the burner exhaust gases and the evaporation products from the melt. In return, the glass melt on the cooled tubes prevents the top space of the furnace from being excessively cooled by the crucible tubes.

In a further preferred embodiment of the invention, top heat is additionally used in the overflow or outlet region in order to prevent excessive cooling of the melt in this region and to ensure the flow of glass. For the configuration of the crucible 1 with a plurality of outlets 1.5, it is also advantageous for top heat to be introduced into each of the additional outlets, in order to allow a continuous flow of gas out of all the outlets. As illustrated in FIG. 1, the top heat can be generated by means of burners 4.

In a further preferred embodiment of the invention, a bridge 2 is connected in front of each individual outlet 1.5. These bridges 2 are expediently configured in such a way that the surface area of all the "dead" zones 10.3 together is kept as small as possible, in order to ensure that the high frequency is introduced into the maximum possible volume of melt and therefore to ensure the highest possible melting rate for the batch. However, embodiments in which a continuous bridge for a plurality of outlets is provided are also entirely conceivable.

The number of outlets which is most favorable for the specific situation, the positioning of these outlets in the upper crucible region, the use of a common bridge or a plurality of bridges, and the geometric configuration of the bridge(s) depend on the individual circumstances and can easily be determined by the person skilled in the art without the need for any inventive step.

Figure 7A:
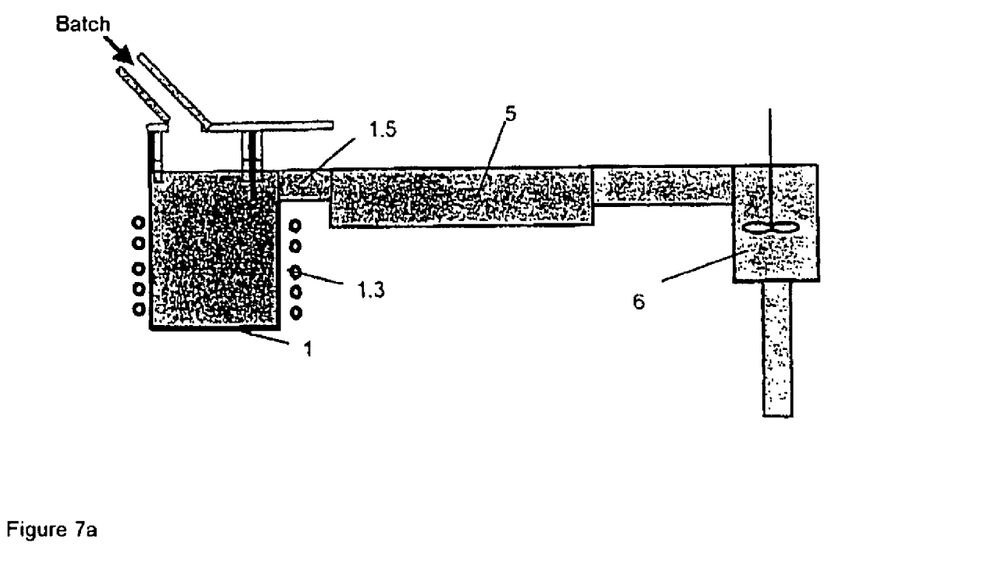
FIG. 7a diagrammatically depicts a side view of a tank furnace with a direct connection between the HF melting crucible and platinum channel for a continuous process.
Figure 7B:
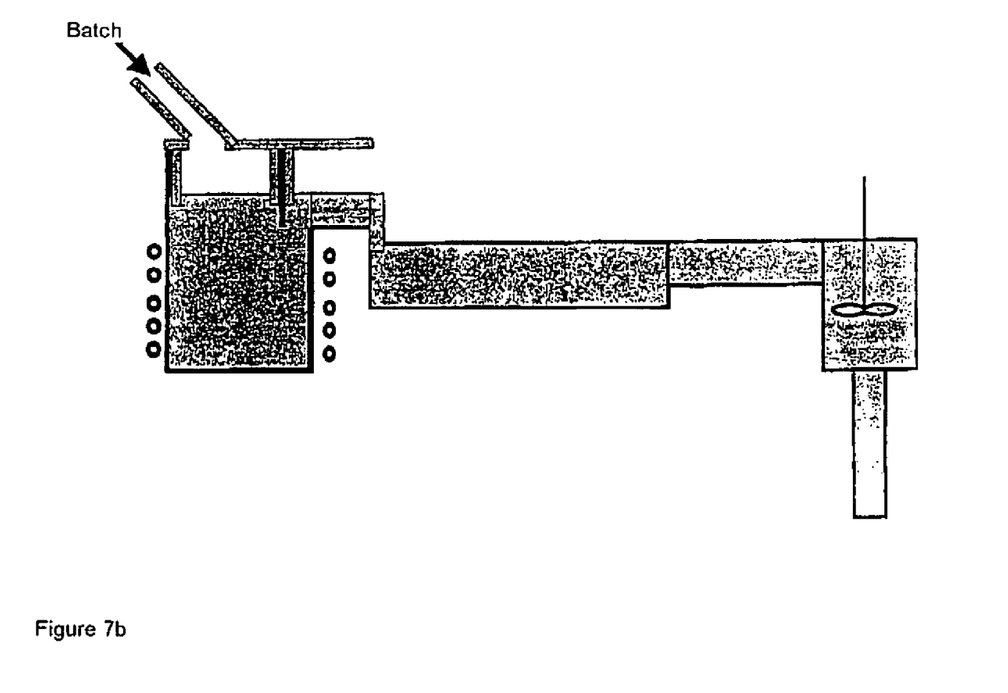
FIG. 7b diagrammatically depicts a side view of a tank furnace with a free-falling glass strand between the HF melting crucible and the platinum channel.

FIG. 7a shows a melting crucible 1 according to the invention in combination with a platinum refining unit 5 and homogenization unit 6. An arrangement of this type can be used, for example, as a continuous melting tank furnace for aggressive, high-purity glasses. In this case, there are various conceivable options for transferring glass between melting crucible 1 and platinum refining chamber 5. For example, the platinum refining chamber 5 may be flanged directly onto the metallic short-circuiting ring at the outer end of the glass outlet 1.5 of the melting crucible 1. In a further preferred embodiment, the melt, as illustrated in FIG. 7b, drops freely, in the form of a glass strand, into the platinum refining chamber 5 and there is no direct connection between the melting crucible 1 and the downstream refining chamber 5 and the homogenization apparatus 6. The drop height for the glass may in this case be selected to be so small, since there are no coil turns in the way, unlike in the known apparatus, that the introduction of bubbles and the formation of cords can be kept within tolerable limits.

Where extreme demands are imposed on purity and in particular on the absence of platinum, it is recommended to use glass-melting installations in which further tank furnaces, crucibles and/or channels which are heated by high frequency are used in addition to the melting crucible according to the invention, for example a high-frequency refining channel as described in DE 199 39 782 A1, DE 199 39 784 A1 or DE 199 39 786 A1, or a high-frequency refining crucible, as known from DE 199 39 772 C1, all of which documents are hereby incorporated by reference in their entirety in the present disclosure.

If the demands imposed on the internal quality of the glass (bubbles, cords) are not particularly great—as is the case for example with soldering glasses—the melting crucible according to the invention can be used to melt the glass without further additional components (refining and homogenization crucible).

EXEMPLARY EMBODIMENT

Melting of High-Melting Aluminosilicate Glasses

An aluminosilicate glass (P1280) DE 19939771.6 having the composition $SiO_2$=65.0% by weight; $Al_2O_3$=22.0% by weight; $Li_2O$=3.75% by weight; $Na_2O$=0.5% by weight; BaO=2.0% by weight; MgO=0.5% by weight; $TiO_2$=2.5% by weight; ZnO=1.75% by weight; $ZrO_2$=1.7% by weight and $V_2O_5$=0.3% by weight was melted in a melting crucible according to the invention, as illustrated in FIG. 1, made from Inconel 600®.

The effective melting volume in the crucible was approx. 25 l. A cooled bridge in accordance with the embodiment illustrated in FIG. 4 or FIG. 3a was used. The immersion depth of the bridge in the melt was approximately 50 mm for a glass level in the glass outlet of approx. 30 mm, i.e. the bottom edge of the bridge was approx. 20 mm below the bottom of the glass outlet. This ensured that it was impossible for any undissolved batch residues to flow through to the glass outlet under the bridge.

Melting crucible, bridge and glass outlet were electrically short-circuited with one another analogously to the embodiment illustrated in FIG. 5.

The glass was melted at an HF frequency of 386 kHz with generator powers of approx. 250 kW. In addition, the melting performance in the melting region was boosted by a burner and bubbling with oxygen. The melted glass was taken off in accordance with the invention above the induction coil arrangement and fed for further processing without passing through the coil region. This was realized by virtue of the base of the glass outlet lying 30 mm above the upper end of the induction coil arrangement. Furthermore, the outer end of the glass outlet projected approx. 70 mm beyond the outer coil radius.

Since the high viscosity of glasses of this type means that relatively large cross sections and throughputs or relatively high temperatures were required in the overflow region, a burner was used in this region to boost the outflow performance.

With the abovementioned melting volume of 25 l, the melting capacity of the melting unit was between 0.5 and 2 t of glass per day and was therefore significantly higher than with the conventional melting methods mentioned in the introduction (1.0 t of glass per day for a melting volume of 90 l).

The invention claimed is:

1. A method for the rapid melting of high-purity, aggressive and/or high-melting glasses in a skull crucible, comprising:
   introducing high-frequency energy into the glasses in the skull crucible by a coil arrangement surrounding the skull crucible, in order to heat the glasses into molten glass;
   discharging the molten glass from an upper region of the skull crucible; and
   retaining undissolved constituents of the molten glass from a discharge arranged in the upper region by a cooled bridge which is immersed in the molten glass, wherein the cooled bridge has an angular cross section or a curved cross section, wherein the molten glass is discharged above the coil arrangement and the discharged molten glass does not flow through the coil arrangement.

2. The method as claimed in claim 1, wherein the molten glass flows out of a glass outlet into a component of the next processing stage, which is fixedly connected to the glass outlet, in a continuous process.

3. The method as claimed in claim 2, further comprising adding heat to the upper region and/or the glass outlet to heat the molten glass.

4. The method as claimed in claim 2, wherein the molten glass overflows at the glass outlet and drops downward in the form of a glass strand.

5. The method as claimed in claim 1, further comprising agitating the molten glass during melting.

6. The method as claimed in claim 1, wherein the molten glass is taken off via a plurality of outlets.

7. The method as claimed in claim 1, further comprising refining and homogenizing the molten glass.

8. The method as claimed in claim 1, further comprising feeding the molten glass directly to a shaping unit.

9. A method for the rapid melting of high-purity, aggressive and/or high-melting glasses in a skull crucible, comprising:
   introducing high-frequency energy into the glasses in the skull crucible by a coil arrangement surrounding the skull crucible, in order to heat the glasses into molten glass;
   discharging the molten glass from an upper region of the skull crucible; and
   retaining undissolved constituents of the molten glass in the skull crucible by a cooled bridge which is immersed in the molten glass at the upper region, wherein the cooled bridge comprises an angular cross section.

10. The method as claimed in claim 9, wherein the molten glass flows out of a glass outlet into a component of the next processing stage, which is fixedly connected to the glass outlet, in a continuous process.

11. The method as claimed in claim 10, wherein the molten glass overflows at the glass outlet and drops downward in the form of a glass strand.

12. The method as claimed in claim 10, further comprising adding heat to the upper region and/or the glass outlet to heat the molten glass.

13. The method as claimed in claim 9, further comprising agitating the molten glass during melting.

14. The method as claimed in claim 9, wherein the molten glass is taken off via a plurality of outlets.

15. The method as claimed in claim 9, further comprising refining and homogenizing the molten glass.

16. The method as claimed in claim 9, further comprising feeding the molten glass directly to a shaping unit.

17. The method as claimed in claim 9, wherein the molten glass is discharged above the coil arrangement and the discharged molten glass does not flow through the coil arrangement.

18. A method for the rapid melting of high-purity, aggressive and/or high-melting glasses in a skull crucible, comprising:
   introducing high-frequency energy into the glasses in the skull crucible by a coil arrangement surrounding the skull crucible, in order to heat the glasses into molten glass;
   discharging the molten glass from an upper region of the skull crucible; and
   retaining undissolved constituents of the molten glass in the skull crucible by a cooled bridge having a curved cross section which is immersed in the molten glass.

19. The method as claimed in claim 18, wherein the molten glass is discharged above the coil arrangement and the discharged molten glass does not flow through the coil arrangement.

20. The method as claimed in claim 18, further comprising feeding the molten glass directly to a shaping unit.

* * * * *